(12) United States Patent
Scuderi

(10) Patent No.: US 8,981,798 B2
(45) Date of Patent: Mar. 17, 2015

(54) ELECTRONIC SYSTEM COMPRISING A SENSOR STRUCTURE AND AN ANALOG INTERFACE CONNECTED THERETO WITH SENSOR INDEPENDENT OPERATING RANGE

(75) Inventor: Antonino Scuderi, Misterbianco (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 163 days.

(21) Appl. No.: 13/564,588

(22) Filed: Aug. 1, 2012

(65) Prior Publication Data

US 2013/0033323 A1 Feb. 7, 2013

(30) Foreign Application Priority Data

Aug. 2, 2011 (IT) ................................ VI2011A0216

(51) Int. Cl.
*G01R 27/08* (2006.01)
*G01D 1/10* (2006.01)
*G01D 1/16* (2006.01)

(52) U.S. Cl.
CPC ... *G01D 1/10* (2013.01); *G01D 1/16* (2013.01)
USPC ..................... 324/705; 324/76.11; 324/750.3; 324/750.06; 330/252; 330/257; 327/77

(58) Field of Classification Search
CPC ....... G01N 33/0031; G01D 1/16; G01D 1/10; H03F 3/45; G01R 19/04; G01R 19/165; G01R 17/02
USPC ...................... 324/750.06, 750.3, 76.11, 705; 330/252, 257; 327/77
See application file for complete search history.

(56) References Cited

U.S. PATENT DOCUMENTS

| | | | |
|---|---|---|---|
| 3,905,230 A | 9/1975 | Calvet et al. | |
| 7,038,447 B2 * | 5/2006 | Motz | 324/249 |
| 7,759,983 B2 | 7/2010 | Carrara et al. | |
| 2003/0197555 A1 * | 10/2003 | Botker | 330/9 |
| 2005/0225331 A1 * | 10/2005 | Berhorst et al. | 324/611 |
| 2007/0113636 A1 * | 5/2007 | Huang et al. | 73/146 |
| 2008/0024175 A1 * | 1/2008 | Carrara et al. | 327/77 |

OTHER PUBLICATIONS

Chang et al., "Fully Differential Current-Input CMOS Amplifier Front-End Suppressing Mixed Signal Substrate Noise for Optoelectronic Applications," School of Electrical and Computer Engineering, Jan. 1, 1999, pp. I-327-330, XP55022048.
Karki, J., "Signal Conditioning Wheatstone Resistive Bridge Sensors," Texas Instruments Application Report, SLOA034, Sep. 1999, 5 pages.

* cited by examiner

*Primary Examiner* — Tung X Nguyen
*Assistant Examiner* — Son Le
(74) *Attorney, Agent, or Firm* — Seed IP Law Group PLLC

(57) ABSTRACT

An electronic system comprises a resistive sensor structure and an electronic circuit portion whose design is selected such that different resistive sensor structures may be combined within the same electronic circuit. To this end, the resistive sensor structure is used as a voltage/current converter that provides input currents to a current amplifier, which in turn provides an amplified output voltage on the basis of a difference of the input currents. The operating range of the current amplifier is adjusted on the basis of a programmable current source irrespective of the configuration of the resistive sensor structure.

20 Claims, 11 Drawing Sheets

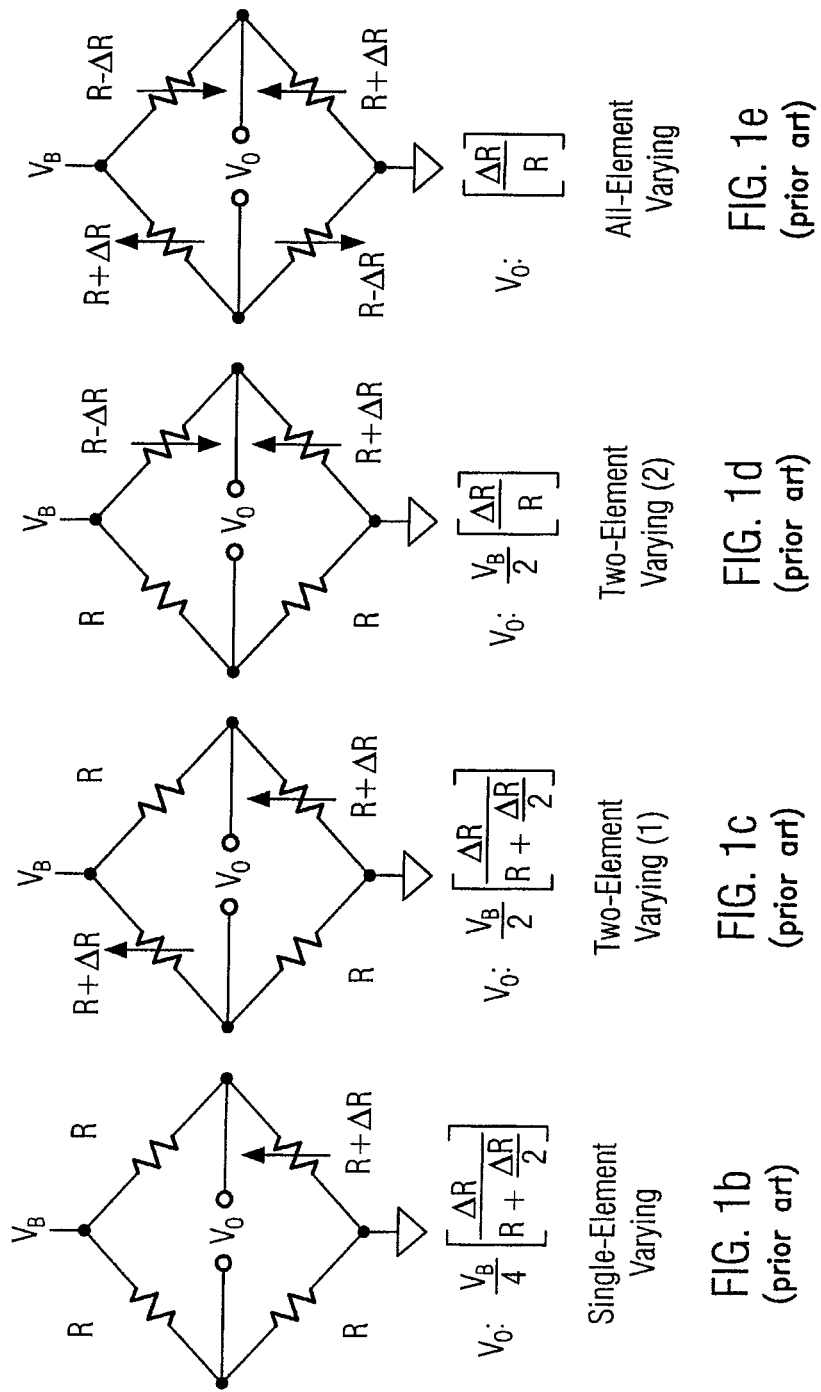

ELECTRONIC SYSTEM COMPRISING A SENSOR STRUCTURE AND AN ANALOG INTERFACE CONNECTED THERETO WITH SENSOR INDEPENDENT OPERATING RANGE

BACKGROUND

1. Technical Field

Generally, the present disclosure relates to smart electronic systems including a sensor structure, such as a temperature sensor, in combination with a dedicated integrated circuit that is connected to the sensor structure and that is configured to control power supply, data processing and the like of the entire electronic system.

2. Description of the Related Art

Immense progress has been made in the field of electronics due to the fact that sophisticated manufacturing techniques in the field of semiconductor industry allow the fabrication of circuit elements, such as transistors, having extremely small critical dimensions, thereby also providing for extremely high packing density in sophisticated semiconductor devices. As a consequence of the progress made in the semiconductor technologies circuit functions can be implemented into a single carrier material, such as a silicon substrate, so that entire circuit systems can be fabricated on a single semiconductor die. Similar progress has been made in the field of semiconductor-based sensor structures, since many of the manufacturing techniques used and developed in the semiconductor industry may also advantageously be applied to the fabrication of semiconductor-based sensors. Moreover, in a further attempt to reduce the overall volume of complex electronic systems different carrier substrate may be combined into a single package, thereby increasing the overall volume density of an electronic system with respect to the volume of a dedicated device package or substrate. Since very complex circuit portions and sensor structures can be fabricated on the basis of volume production techniques, the total cost per individual device has been significantly reduced in the past, thereby allowing the application of complex electronic systems in a wide variety of technical fields and circumstances. The low production costs may even enable the fabrication of disposable electronic systems, which may have a very limited time of usage while on the other hand producing valuable data and information with respect to a plurality of applications, however, without significantly contributing to the overall cost of ownership of specific applications.

Generally, a corresponding smart system may comprise one or more sensors, which can generate an output signal whose variation depends on parameters to be monitored, such as temperature, pressure, magnetic field, humidity, and the like, wherein dedicated electronic circuitry receives the sensor signal and provides the resources to at least preprocess the sensor signal so as to obtain information or data that is stored in the smart system or that is frequently communicated to an external device for further usage or processing.

FIG. 1a schematically illustrates a top view of a smart electronic system 100, which comprises one or more sensors 110 that are operatively connected with a dedicated integrated circuit 130 via any appropriate connection 102. The integrated circuit 130 is typically referred to as an ASIC (application specific integrated circuit) and provides for the interface capabilities for connecting to the one or more sensors 110 and has also implemented therein functions for the entire electronic system 100 in order to generate the desired data and information. Typically, the integrated circuit 130 comprises an energy management unit 170 that provides energy for operating the system 100. To this end, the circuit portion 170 may comprise any appropriate transducers, energy storage elements, and the like in order to convert externally applied energy, such as mechanical energy, heat, radiation energy, and the like, into electric energy, while in other cases in addition to or alternatively to energy converters also appropriate energy storage elements, such as batteries, and the like may be provided so as to power the electronic system 100. Moreover, a circuit portion 150 is implemented so as to act as an analog interface, also referred to as analog front end (AFE), in which an appropriate analog signal processing is accomplished on signals received from the sensor 110 via the connection 102. Furthermore, the electronic circuit 130 comprises a control unit 140, typically implemented by digital logic possibly in combination with a memory area, analog/digital and digital/analog converters, and the like, for performing the overall function of the electronic system 100. Furthermore, the control unit 140 is typically configured to control operation of the various circuit portions the electronic circuit 130. Moreover, a communication channel is frequently provided for instance in the form of a radio frequency (RF) transmitter/receiver 160, which is connected to an antenna 180 via any appropriate connection 103, thereby establishing a wireless communication channel. Consequently, the electronic system 100 can communicate with any external device by means of the wireless communication channel, thereby offering superior flexibility for using the electronic system 100 in various applications. It should be appreciated, however, that a communication channel to a peripheral device may be implemented in addition to or alternatively to the wireless communication path on the basis of a wired communication channel, if considered appropriate. In other cases the electronic system 100 may be provided without any communication resources for communicating with peripheral devices, when, for instance, the system 100 itself is appropriately configured to respond to any sensor signals obtained from the sensor 110 by using appropriate circuit portions (not shown), which may comprise electromechanical actuators, power electronics, and the like.

In many applications the electronic system 100 is developed for very restricted conditions, for instance as a disposable system in healthcare applications, in applications, in which compact organic substrates are used in combination with an electronic system, wherein frequently the electronic system, such as the system 100, is to be operated on the basis of a reduced power consumption order to enhance overall flexibility, reduce cost of ownership and provide for a desired long usable lifetime, for instance when used as a stand-alone system for specific monitoring applications, such as monitoring environmental conditions, and the like. For this reason, the electronic circuit 130 is typically designed in view of low power consumption, while at the same time providing for a desired degree of noise immunity, accuracy with respect to signal and data processing, and the like. To this end a plurality of highly sophisticated semiconductor manufacturing technologies are available. Similarly, the one or more sensors 110 may also significantly contribute to the overall power consumption of the system 100, thereby making desirable dedicated sensor structures in order to achieve the desired sensitivity, without unduly increasing the overall power consumption of the electronic system 100. Since resistive sensor structures may readily be implemented into a semiconductor-based carrier material, a Wheatstone bridge-like sensor structure is one of the most frequently used type of sensors in integrated semiconductor devices, such as the electronic system 100.

FIGS. 1b to 1e schematically illustrate circuit diagrams of different Wheatstone bridge architectures and the resulting output voltages for a given supply voltage $V_B$ of the resistive bridge.

FIG. 1b schematically illustrates the case in which three of the four bridge resistors are non-varying resistors, while a fourth resistor is considered as a varying resistor, whose resistance value is influenced by a certain parameter, such as temperature, length distortion, and the like.

FIG. 1c schematically illustrates the bridge architecture in which two resistors of oppositely arranged bridge legs are considered as varying resistors, while the remaining resistors have a substantially constant resistance value. As shown, in this case the resulting output voltage is twice the output voltage of the architecture having one varying resistor.

FIG. 1d schematically illustrates the architecture, in which also two resistors are varying resistors that are arranged within the same bridge leg and that is an opposite sign of the change of resistance value when exposed to the same influencing parameter. Also in this case the output voltage is higher compared to the case, in which only one varying resistor is provided.

FIG. 1e schematically illustrates the architecture, in which the resistance values of the four bridge resistors vary in such a way that the resistance values of two oppositely arranged resistors vary in opposite direction, thereby obtaining an output voltage that is basically four times the output voltage obtained from the bridge having only one varying resistor.

Generally, in the present application a "varying resistor" is to be understood, compared to a non-varying resistor, as a resistor having a resistance value that changes under the influence of the certain environmental parameter, such as temperature, and the like, by at least twice the magnitude compared to the non-varying resistor. For example, in a resistive structure in which the change of the resistance value of one of the resistors is to be induced by generating a length distortion, for instance by positioning the resistor on a flexible membrane, this resistor is considered as a varying resistor compared to another resistor, which is formed on a more rigid portion of the substrate material so that upon any mechanical influence on their flexible membrane the resulting distortion and thus resistance change of the "varying" resistor is at least twice the change of the non-varying resistor. Similar criteria also apply to other influencing parameters, such as temperature, and the like.

FIG. 1f schematically illustrates a bridge circuit comprising the resistors R1, R2, R3 and R4, which results in an output voltage as indicated in equations (1):

$$V_0 = \frac{\frac{R1}{R2} - \frac{R3}{R4}}{\left[1 + \frac{R1}{R2}\right]\left[1 + \frac{R3}{R4}\right]}$$

$$V_0 = \frac{R1R4 - R2R3}{(R1 + R2)(R3 + R4)}$$

Consequently, at balance, i.e., for an output voltage $V_0=0$, the condition as described by equation (2) is to be met.

$$V_0 = 0 \text{ IF } \frac{R1}{R2} = \frac{R3}{R4}$$

If, for instance, a substantially temperature independent output voltage is to be obtained from the bridge of FIG. 1F, a variation of the resistance value of any of the bridge resistors is determined by a certain parameter of interest, while the temperature induced variation is identical for each of the bridge resistors R1, ..., R4. For example, in a linear approximation the temperature dependence of the resistance values can be described by equation (3):

$$R=f(T) \rightarrow R(T)=Ro[1+(a/1e6)(T-To)]$$

a=Temperature Coefficient of Resistance (TCR, ppm/K), so that the same temperature coefficient has to be implemented in each resistor of the bridge to obtain a temperature independent sensor signal with respect to the varying parameter of interest, which may be caused by, for instance, a deformation of one or more of the resistors R1, ..., R4. On the other hand, when using the bridge as a temperature sensor, a different temperature sensitivity has to be implemented for at least one of the resistors in order to obtain a temperature dependent sensor signal, since then the temperature dependency as described in equation 3 results in an appropriate output signal, as long as the variation of at least one of the resistors is sufficiently different from one or more of the other resistors. For example, frequently two resistors of the bridge are implemented so as to have a negative temperature coefficient compared to the remaining two resistors, thereby obtaining a maximum difference in the resistance value and thus the output voltage for a given change in temperature.

Typically, a certain resolution over a desired operating range of the sensor is desirable in order to obtain a precise measurement within the specified operating range. As can be seen from the above cited equations, however, the resolution, i.e., the change in voltage of the bridge relative to a certain change of the parameter of interest, depends on the ratio of the change of resistance and the total resistance so that the output voltage is reduced for a high total resistance of the bridge for a given delta of the resistance value as caused by a variation of the parameter of interest. Since the change of the resistance value may be moderately small for a given change of a parameter to be monitored, a relatively small total resistance value of the bridge sensor is desirable. On the other hand, with regard to low power consumption, however, the current across the bridge is to be reduced for a given bridge voltage, which can be achieved by employing moderately high resistance values of the bridge resistors. Consequently, in low power applications typically a compromise is to be made between the resolution and thus low intrinsic noise level and the power consumed by the sensor structure. Therefore, frequently low-power sensor structures are not sufficiently sensitive for certain applications, for instance for temperature in a very limited temperature range, for instance between 30 and 45° C. for typical temperature coefficients associated with typical semiconductor-based materials as are used for the fabrication of semiconductor bridge sensors. Also in other cases moderately high resistance values may generally restrict the applicability of such low-power sensor structures in many monitoring applications.

For these reasons it has been proposed to implement a further amplification chain into the circuit portion 150 (cf. FIG. 1a) which may thus increase the resulting output voltage. On the other hand, implementing an additional amplification chain may introduce additional flicker noise, thereby eventually reducing the entire sensor resolution. Furthermore, any mismatches of the resistance values of the bridge resistors may result in an offset, which in turn can saturate the amplifier chain of the circuit or may at least increase the power supply rejection ratio (PSRR) of the amplifier.

FIG. 1g schematically illustrates a circuit diagram of a typical bridge architecture, in which the bridge 110 is connected to an amplifier 151 within the circuit portion 150, thereby providing an amplified output signal, wherein the gain of the amplifier 151 may be adjusted on the basis of a gain resistor 152, while an offset correction may be achieved on the basis of an adjustable voltage source 153.

FIG. 1*h* schematically illustrates a typical configuration of the electronic system 100 including the sensor 110 and their connection 102 so as to connect the circuit portion 150, which in turn comprises the amplifier 151 as explained above with reference to FIG. 1G. Moreover, the output signal of the circuit portion 150, i.e., the output signal of the amplifier 151, may be supplied to the circuit portion 140 of the circuit 130, wherein the circuit portion 140 is illustrated in the form of a microprocessor. In the circuit portion 140 an appropriate data processing is performed, as is also previously discussed, and the results of the processing may be communicated by a communication channel, as is also discussed above with reference to FIG. 1A, while in the example shown information or data can be displayed on a display unit 135 depending on the overall configuration and the application of the electronic system 100. As discussed above, however, the amplifier 151 may represent itself an additional source of noise and may also require a specific adaptation of the circuit portion 150 i.e., of the analog front end of the circuit portion 130, to the specific sensor structure 110. That is, the output voltage of the amplifier 151 depends on the gain of the amplifier 151 and the bridge resistance, and also depends on the adjustable offset voltage provided by the voltage source 153. Consequently, upon designing electronic systems for different applications, which may require different types of sensor structures 110, a redesign of the circuit portion 130 is required in order to take into account the specific configuration of the sensor structure to be used for a specific application.

Therefore active bridges have been developed, in which a preprocessed signal is provided so as to avoid the adaptation of the analog front end interface of the ASIC. That is, the signal conditioning is implemented into the bridge structure in order to provide a standardized output signal, which is received by the ASIC without requiring any modification of the design of the ASIC upon changing the sensor structure. Consequently, for different types of sensor structures the same ASIC can be used.

FIG. 1*i* schematically illustrates a typical configuration of a basic active bridge circuit, wherein one bridge leg includes between a first reference resistor, a first variable resistor, a p-channel transistor T3, and an n-channel transistor T4, respectively, connected in series, while the other bridge leg includes a p-channel transistor T1 and an n-channel transistor T2 between a second variable resistor and a second reference resistor. Moreover, a programmable offset current source may also be connected to the power inputs of the p-channel transistors T1 and T3, i.e., to the source terminals of these transistors. Consequently, upon a variation of the variable resistors a shift of the output voltage is obtained, which may further be processed as required. Seen from another point of view, the active circuitry of the bridge structure may be considered as a first current mirror formed by the p-channel transistors T1 and T3, wherein the first current mirror is connected in series to a second current mirror formed by the n-channel transistors T2 and T4 so that a corresponding change of the resistance value and thus of the current results in a corresponding shift of the output voltage at the output node of the bridge configuration.

Although the basic configuration as shown in FIG. 1*i* provides for superior flexibility in combining different types of sensor configurations with the same ASIC design, however, the overall gain of the active bridge depends on the resistance values of the sensor resistors thereby requiring a specific adaptation the active circuitry in view of the sensor structure to be used. More, the transistors of the active bridge circuit have to be implemented in the same carrier material as is used for forming the bridge resistance. Additionally, the overall current consumption of the active sensor structure may be moderately high, depending on the specific values of the bridge resistors.

BRIEF SUMMARY

One embodiment of the present disclosure is an electronic system including a sensor structure, wherein superior operating characteristics and a high degree of flexibility in combining a given design of an electronic circuit with various sensor structures may be achieved.

According to one aspect of the present disclosure there is provided an electronic system the electronic system comprises a sensor structure that includes a plurality of resistors, at least one of which is a variable resistor. The electronic system further comprises an electronic portion that includes an analog interface connected to the sensor structure, wherein the analog interface comprises a current amplifier supplied by an adjustable current source. The current amplifier is configured to receive first and second input current from the sensor structure and to provide an output signal indicated of an amplified difference of the first and second input currents.

The sensor structure, i.e., at least some of the plurality of resistors, is used as a voltage/current converter in order to provide the first and second input currents for the current amplifier, which in turn is supplied, i.e., powered, by the adjustable current source so that the operating range of the current amplifier can be adjusted on the basis of the adjustable current source irrespective of the characteristics of the sensor structure. Hence, the same analog interface can be used in combination with different sensor structures, since the operating range of the current amplifier can be adjusted within a wide window of input currents, while the current amplifier at the same time ensures high resolution at low power consumption.

In a further preferred embodiment the electronic system further comprises a control unit in the circuit portion, the control unit being configured to control the current source so as to maintain a valid operating range of the current amplifier. In this manner the circuit portion itself enables an adaptation to different sensor structures or varying operating conditions of the same sensor structure for a fixed configuration of the electronic portion.

In a further advantageous embodiment the electronic system comprises a flexible substrate carrying the sensor structure and the circuit portion. By using their flexible substrate and due to the superior flexibility in combining the same design of the circuit portion with different sensor structures, a wide variety of low cost and low power applications may be covered by the inventive smart electronic system. For instance, in the field of healthcare applications, in which basically the device is to be provided in a resilient package in order to enable the incorporation of the smart electronic system into flexible products, such as clothes, bandages, and the like so as to obtain valuable information with respect to the status of a person. It should be appreciated, however, that due to the resiliency of the electronic system many other applications are available, in which high accuracy, low power consumption and low cost for producing the electronic system for various monitoring applications are of great importance.

In a further advantageous embodiment the electronic system further comprises a first carrier material, in and above which is formed the sensor structure, and the electronic system further comprises a second carrier material, in and above which is formed in the electronic portion wherein the first and second carrier materials are separated from each other. While many applications of the inventive electronic system may be based on the concept that at least a portion of the analog interface is incorporated in the same carrier material as is used for providing the sensor structure, in this embodiment a further increased degree of flexibility respect to applicability and the manufacturing process, since the sensor structure may be formed in and above any appropriate carrier material on the basis of any desired process technology, while independently there from the circuit portion may be formed in a separate carrier material without requiring a redesign of the analog interface when different versions of the electronic systems are to be fabricated by using different types of sensor structures. For example, the sensor structure may be provided in the form of a passive resistive structure, which comprises an appropriate interconnection system so as to enable accessibility of the various resistors in the sensor structure. On the other hand, the active circuit components, i.e., the current amplifier, may be implemented into the circuit portion on the basis of any appropriate header material and process technology so that the sensor structure and the circuit portion are finally packaged on the basis of any appropriate package or substrate material.

In one illustrative embodiment the current amplifier is composed of transistors of the same conductivity type. In this manner, any desired and well established manufacturing technology may be applied upon forming the current amplifier such as MOS technology, bipolar technology, combined MOS technology and bipolar technology, and the like, wherein the conductivity type of the transistors may be selected on the basis of criteria such as deduced area consumption in the semiconductor substrate, overall production cost, and the like. For example, by providing the transistors in the form of field effect transistors, the selection of n-channel transistors may result in a highly space efficient implementation.

In other illustrative embodiments transistors of inverse conductivity type may be used for implementing the current amplifier, for instance on the basis of CMOS technology, thereby enhancing overall performance in terms of gain and power consumption of the current amplifier.

In a further illustrative embodiment, the current amplifier comprises a first current mirror and a second current mirror, which may have any appropriate design, for instance comprising two transistors, three transistors or more per each current mirror so as to specifically adapt the characteristics of the current amplifier in view of the overall design and performance specifications.

In a further illustrative embodiment the electronic system further comprises a chopper stage connected between the sensor structure and the current amplifier. In this manner, DC noise compensation can be enhanced by alternatingly connecting the bridge legs with a different current path of the current amplifier.

The electronic system may be provided with a sensor structure that is sensitive to temperature and/or pressure and/or magnetic field and/or humidity. In some illustrative embodiments the electronic system comprises the sensor structure as a temperature sensor with high sensitivity my wherein in some particular embodiments, a pronounced sensitivity is obtained with a temperature range of approximately 30° to 45° C., thereby making the inventive electronic system particularly useful in healthcare applications.

According to a further aspect of the present disclosure an electronic system is provided which comprises a resistive sensor structure that is formed above a flexible substrate material and that is responsive to at least one external influence. The electronic system further comprises an interface circuit connected to the resistive sensor structure and being formed above the flexible substrate material. The interface circuit comprises an adjustable current amplifier configured to receive an input current and to output signal indicative of the response of the resistive sensor structure to the at least one external influence. Hence, also in this case the resistive sensor structure provides a current input signal and thus acts as a voltage/current converter, wherein the input signal is appropriately amplified by the current amplifier so as to generate an appropriate output voltage. Moreover, due to the fact that these components are provided above the flexible substrate material and a superior flexibility is obtained with respect to combining the interface circuit with different types of resistive sensor structures, a wide variety of applications can be covered by the inventive electronic system, while at the same time superior performance at low power consumption may be provided by the electronic system with respect to sensor signal processing.

BRIEF DESCRIPTION OF THE SEVERAL VIEWS OF THE DRAWINGS

Further illustrative embodiments of the present disclosure are defined in the appended claims and the present disclosure will now be described in more detail with reference to the attached drawings, in which:

DETAILED DESCRIPTION

Figure 1A:
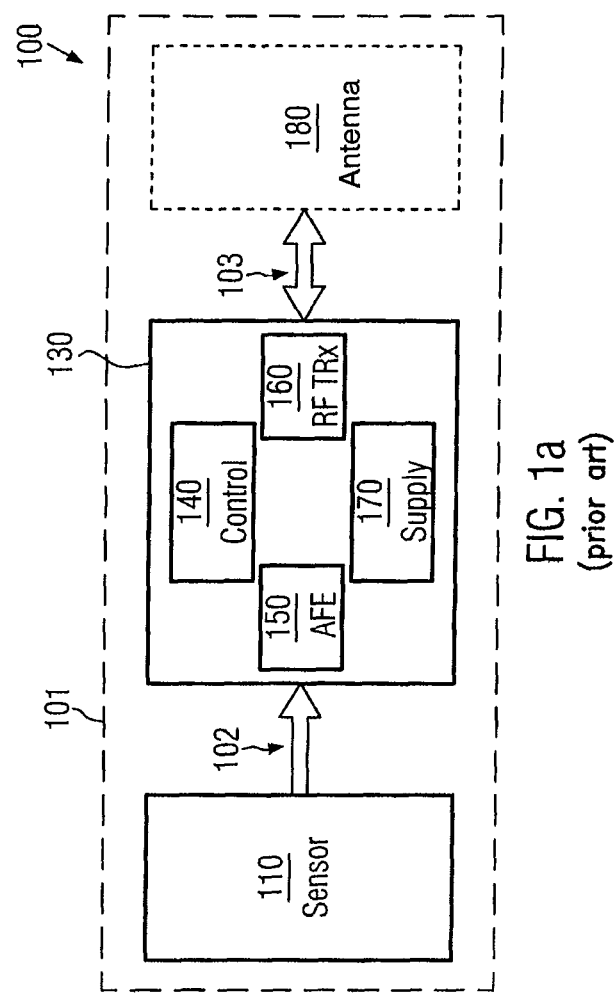
FIG. 1a schematically illustrates a top view of a conventional smart electronic system that comprises a sensor structure, FIGS. 1b to 1e schematically illustrate circuit diagrams of various resistive bridge configurations, FIG. 1f schematically illustrates a circuit diagram of a Wheatstone bridge configuration, which may be used as a temperature sensor, FIG. 1g schematically illustrates a circuit diagram of an amplifier chain connected to a passive bridge configuration according to conventional strategies, FIG. 1h schematically illustrates a smart electronic system including the amplifier chain as shown in FIG. 1g, FIG. 1i schematically illustrates a circuit diagram of active bridge circuitry as is frequently used in conventional circuit designs, FIG. 2a schematically illustrates a cross-sectional view of an electronic system of the present disclosure comprising a sensor structure and an interface circuit formed on the basis of a current amplifier by using a voltage to current conversion mechanism provided by the sensor structure, FIG. 2b schematically illustrates a more detailed you of the electronic system, i.e., of the sensor structure and an electronic portion including the interface circuit, FIG. 2c schematically illustrates a circuit diagram of an actual implementation of the adjustable current amplifier used in the interface circuit according to illustrative embodiments of the present disclosure, FIGS. 2d and 2e schematically illustrate simulation results obtained from the inventive current amplifier on the basis of input currents supplied by the resistive sensor structure (FIG. 2d) in comparison to a passive bridge circuit having the same resistance values (FIG. 2e), FIGS. 2f, 2g and 2h schematically illustrate circuit diagrams of further implementations of the adjustable current amplifier or portions thereof and FIG. 2i schematically illustrates a circuit diagram of a further embodiment, in which a couple stage is implemented in order to reduce noise in DC measurement.
Figure 1G:
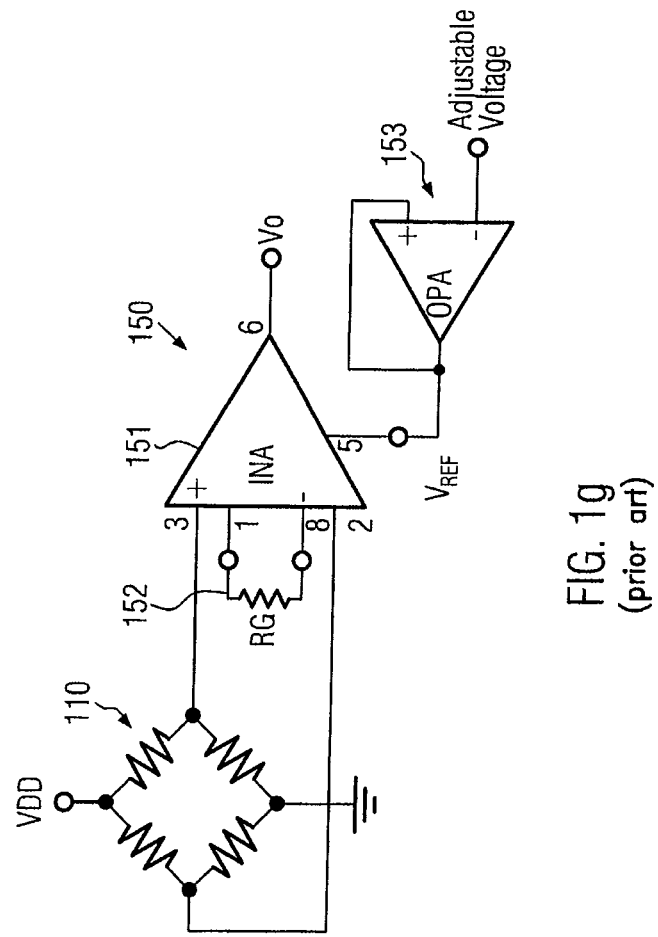
Figure 1F:
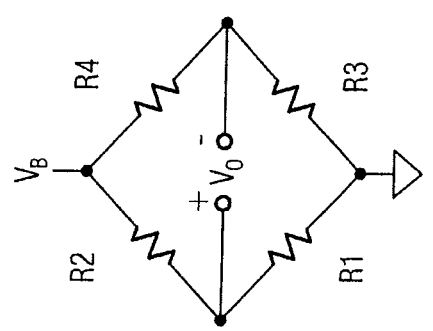
Figure 1H:
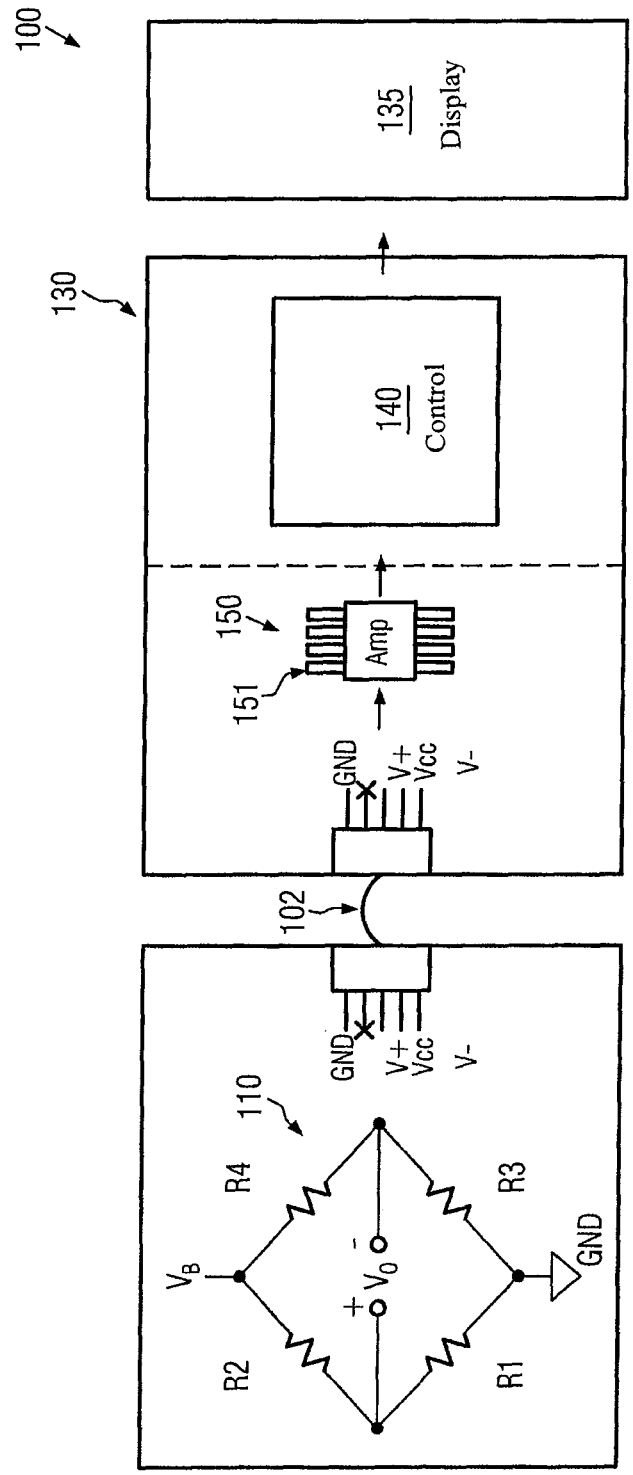
Figure 1I:
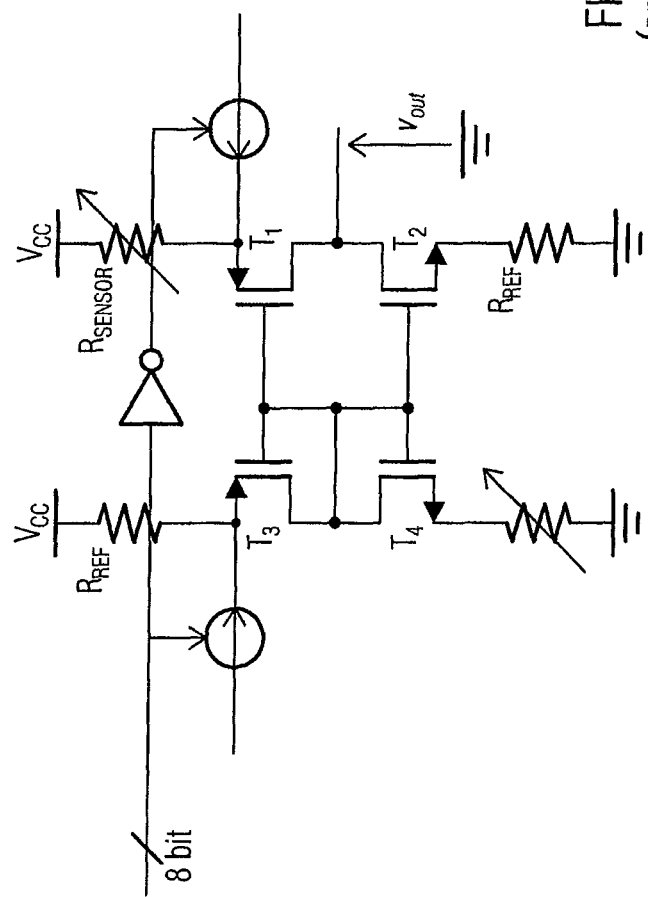
Figure 2A:
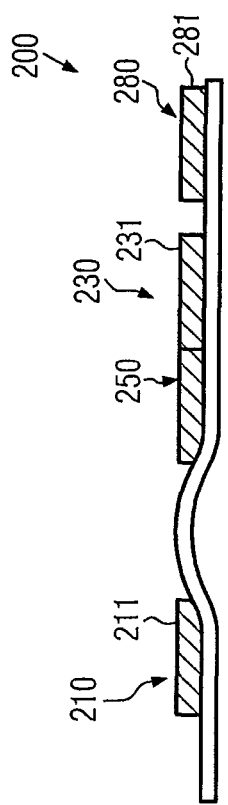

FIG. 2a schematically illustrates a cross-sectional view of an electronic system 200 comprising a substrate 201, which in the embodiment shown, is a flexible substrate material above which are formed various components of the electronic system 270. A sensor structure 210 is formed in and above an appropriate carrier material 211 and is in the form of a resistive sensor structure, as will be explained in more detail below, wherein the carrier material 211 may be a semiconductor material, and the like. It should be appreciated, as discussed above, that various technologies and base materials may be used for implementing a resistive sensor structure, for instance in the form of temperature sensitive resistors, pressure sensitive resistors, and the like. Moreover, the electronic system 200 comprises a circuit portion 230, which in turn comprises an analog interface circuit 250 so as to connect to the resistive sensor structure 210 by using any appropriate interconnection system, as is for instance also explained above with reference to the electronic system 100. In the embodiment shown the interface circuit 250 is formed in and above a carrier material 231, in which also other circuitry of the circuit portion 230 is implemented, wherein the carrier material 231 is separated from the carrier material 211 which both are mechanically combined via the substrate material 201. It should be appreciated, however, that in other illustrative embodiments (not shown) the sensor structure 210 and the interface circuit 250 or at least a portion thereof may be formed in and above one and the same carrier material. Moreover, the electronic system 200 may comprise a further component 280, such as an antenna, power circuitry, electromechanical actuators and the like, which may be formed on a separate carrier material 281, such as a semiconductor material, and the like. In some cases, the further component 280 may also be formed in and above the carrier material 231 if compatible with the circuitry in the circuit portion 230.

In some illustrative embodiments, in which the substrate material 201 is provided as a flexible material, the electronic system 200 is thus resilient to a certain degree and may thus incorporated into or attached to deformable materials and products as for instance required in a plurality of healthcare applications, and the like.

Figure 2B:
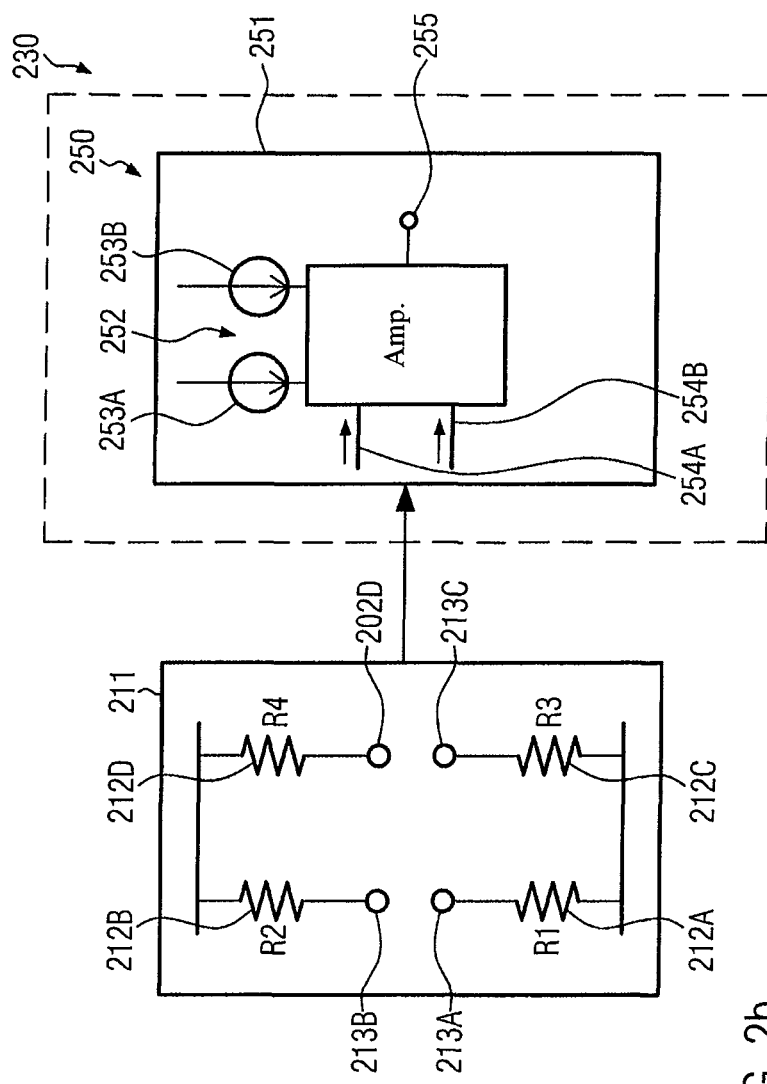

FIG. 2b schematically illustrates the resistive sensor structure 210 in more detail according to one illustrative embodiment, in which resistors 212A, . . . , 212D are provided so as to have respective resistance values R1, . . . , R4. Moreover, in the embodiment shown corresponding terminals 213A, . . . , 213D are arranged so as to allow access to the individual resistors of the structure 210, while also respective two of the resistors are commonly connected to a corresponding supply voltage line. For example, the resistors 212B, 212D are connected to one supply voltage line, while the resistors 212A, 212C are connected to the other supply voltage line. The sensor structure 210 is connected to the interface circuit 250 by any appropriate interconnection structure 202, wherein the interface circuit 250 is a part of the circuit portion 230, as discussed above. The interface circuit 250 comprises a current amplifier 252, which receives its supply current from the first adjustable current source 253A and from a second adjustable current source 253B. That is, the adjustable current amplifier 252 is powered by the adjustable current sources 253A, 253B. The current amplifier 252 is connected so as to receive at a first input node 254A a first input current supplied by the sensor structure 210 and to receive at a second input node 254B a second input current supplied by the sensor structure 210. In the present embodiment, the resistors 212B, 212D connected to the supply voltage Vdd function as voltage/current converters that provide the first and second input currents.

Consequently, upon operating the circuit portion 230 and the sensor structure 210, when the circuit portion 230 and thus the current amplifier 252 and the adjustable current sources 253A, 253B are connected to an appropriate supply voltage and also the sensor structure 210 is connected to an appropriate supply voltage, which do not need to be identical, the sensor structure 210 provides the input currents at the nodes 254A, 254B, the difference of which is amplified and provided as an output signal at an output node 255. The magnitude of the input currents depends on the supply voltage of the structure 210 and on the resistance values. Irrespective of the configuration of the sensor structure 210, the operating range of the current amplifier 252 is adjusted using the adjustable current sources 253A, 253B, thereby enabling an appropriate adaptation of the operating range of the amplifier 252 with respect to a wide variety of different configurations of resistive sensor structures, i.e., for different resistance values and thus input currents. Consequently, the same configuration of the circuit 230 and thus of the analog interface circuit 250 may be used in combination with different sensor structures 210 or varying operating conditions, such as a re-adjusted operating voltage of the sensor structure 210, and the like. To this end, in some embodiments, the sensor structure 210 and the circuit portion 230 including the interface circuit 250 may be formed on separate carrier materials, as discussed above, so that a high degree of flexibility is achieved for the fabrication of the electronic system 200. At the same time, the overall production cost can be maintained at a very low level, since the same design of the circuit 230 may be used in combination with different configurations of the sensor structure 210, depending on the specific application of a corresponding combined electronic system 200.

Figure 2C:
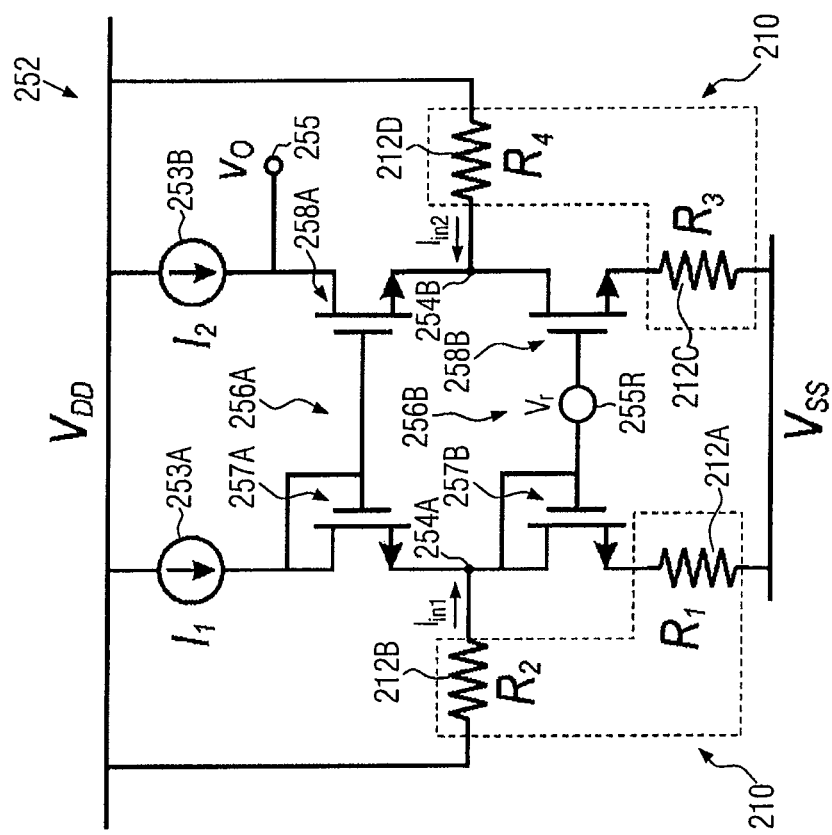

FIG. 2c schematically illustrates a circuit diagram of an actual implementation of the current amplifier 252. As shown, the current amplifier 252 comprises a first current mirror 256A, which in the embodiment shown is implemented in the form of a simple current mirror including transistors 257A, 258A. The transistors 257A, 258 are shown as field effect transistors, although bipolar transistors, and the like, could be employed depending on the process technology to be used for implementing the current amplifier in the circuit 230. The first current mirror 256A is supplied by the adjustable current sources 253A, 253B, i.e., in the case of n-channel field effect transistors the current supplied by the sources 253A, 253B are fed into the respective drain terminals of the transistors 257A, 258A, respectively. It should be appreciated that in other illustrative embodiments the transistors 257A, 258A could be in the form of p-channel transistors or as PNP transistors, if a bipolar transistor technology is considered. Moreover, the "power outputs" of the first current mirror 256A, i.e., the source terminals of these transistors, are connected to the input nodes 254A, 254B, respectively, which also receive the input currents Iin1, Iin2 of the sensor structure 210. First current mirror 256A is connected to a "power input" of a second current mirror 256B i.e., the drain terminals of transistors 257B, 258B are connected to the input nodes and thus to the source terminals of the transistors 257A, 258A. On the other hand, the power outputs of the second current mirror 256B, i.e., the source terminals of the transistors 257B, 258B, are connected to the sensor structure 210, i.e., to the resistors 212A, 212C, respectively. The output voltage at the output node 255 may be referenced to the supply voltage Vss or to a reference voltage node 255R depending on the further signal processing.

For example, for a typical bridge configuration the resistors 212B, 212D may have the same basic resistance value, and similarly the resistors 212A, 212C may also have a common resistance value, wherein the resistance values of these resistive pairs may differ from each other. In order to implement a temperature sensitive configuration in the structure 210, the temperature coefficients of the resistors 212B, 212D on the one hand are selected to be substantially identical. Similarly, the temperature coefficients of the resistors 212A, 212C on the other hand are also selected to be substantially identical, however, with an inverse sign compared to the temperature coefficients of the resistors 212B, 212D. In this manner, a desired temperature dependent variation of the input currents at the nodes 254A, 254B and thus a corresponding temperature varying output voltage at the node 255 is obtained that corresponds to an amplified difference of the input currents. On the other hand, gain and offset of the current amplifier 252 are adjusted on the basis of the programmable or adjustable current sources 253A, 253B, thereby allowing an adaptation to the specific configuration of the sensor structure 210 without requiring a modification of the hardware configuration of the amplifier 252. That is, since a different sensor structure may provide different input currents due to its different voltage/current conversion characteristic for a given supply voltage of the sensor structure the amplifier characteristics, such as gain, offset and generally calibration can be appropriately adjusted by programming the current sources 253A and/or 253B which can be achieved for a wide variety of input currents with the same circuit configuration of the amplifier 252.

Figures 2D, 2E:
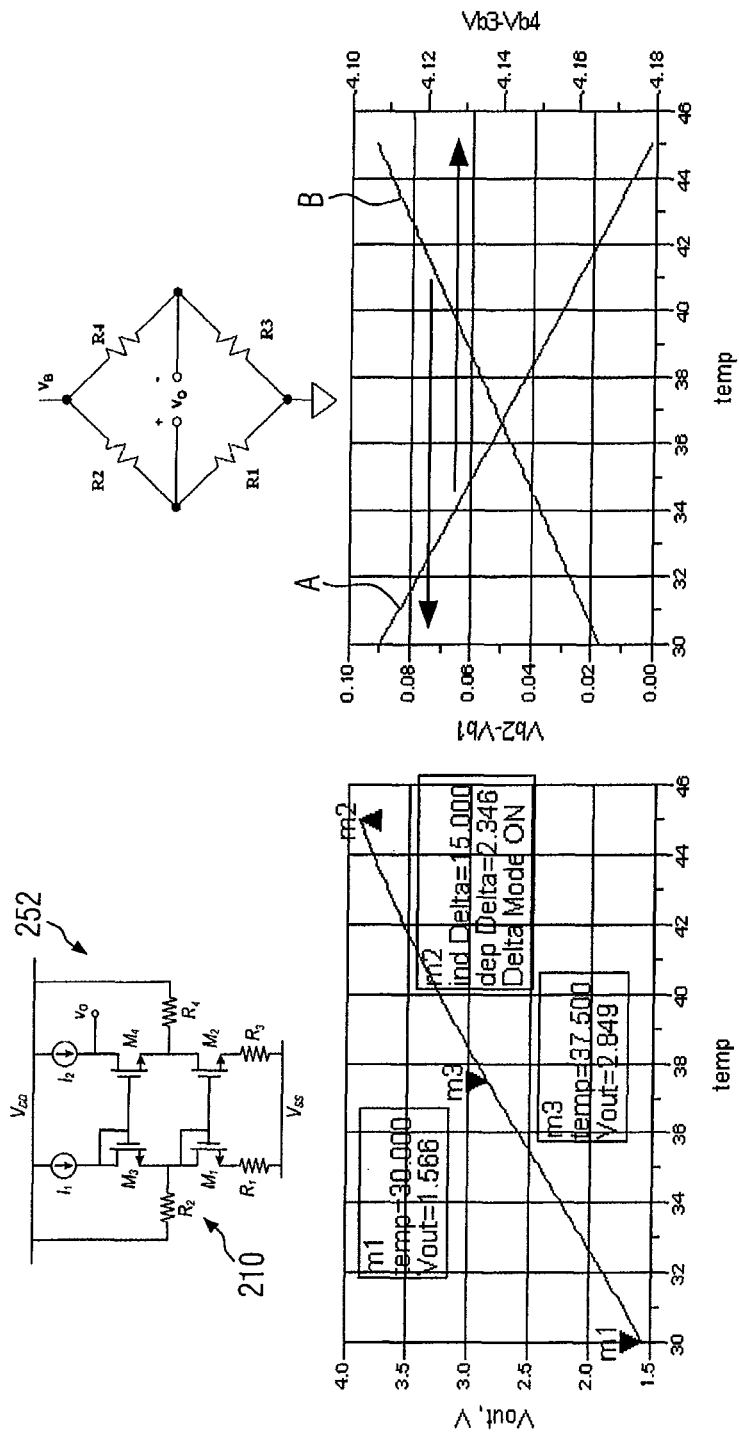

FIG. 2d schematically illustrates simulation results when operating the amplifier 252 and the resistive sensor structure 210. In the simulation the resistance values of the resistors 212B, 212D (CF FIG. 2C), indicated as R2 and R4, are 100 kΩ, while the resistance values R1, R3 corresponding to the resistors 212A, 212C (CF FIG. 2c) are selected as 10 kΩ. Furthermore, in the simulation the sum of currents driven through the amplifier 252 by the adjustable current sources are the same and are, in one example, approximately 100 µA, while in a further example 65 µA are used. Furthermore, the temperature coefficient is selected as 0.003 with different sign for the resistance values R1, R3 on the one hand and R2 and R4 on the other hand. In this case for a temperature range of 30° C. to 45° C. a change of the output voltage of greater than 2.3V for a bridge supply voltage of 5 V is obtained. In a further example a reduction of the supply voltage to 2.5 V with the current through the amplifier 252 reduced to 65 µA produces a change of the output voltage across the above specified temperature range of greater than 0.9 V.

FIG. 2e schematically illustrates the simulation results when using a passive sensor bridge 210P, wherein the same resistance values and supply voltages are used as in the active circuit shown in FIG. 2d. For example, curve A represents the results of the simulation for the passive bridge configuration, in which the resistance values R1, R4 are 10 kΩ with a negative temperature coefficient, while the resistance values R2, R3 are 100 kΩ with a positive temperature coefficient. In this case, the current driven through the bridge 210P is approximately 100 µA for a supply voltage of 5 V. Under these conditions the change of the output voltage for the above specified temperature range is approximately 0.007 V. Similarly, curve B represents the results of a simulation for a configuration, in which the resistance values R2, R4 are 100 kΩ the resistance values R1, R3 are 10 kΩ with the latter resistors having a negative temperature coefficient. Also in this case the change of the output voltage is 0.007 V. As is evident from the simulation results, the total power consumption in the active circuitry may be comparable or even less compared to the passive circuit configuration, while the change and thus the resolution of the output voltage of the active circuitry is significantly greater across the specified temperature range compared to the small voltage variation obtained from the passive circuit. For example, a total current of approximately 65 µA, i.e., a power consumption of approximately 163 mW, and the voltage change of greater than 0.9 V compares to a total current of approximately 100 µA, i.e., a power consumption of approximately 500 mW, and a change of output voltage of 0.007 V.

Figure 2F:
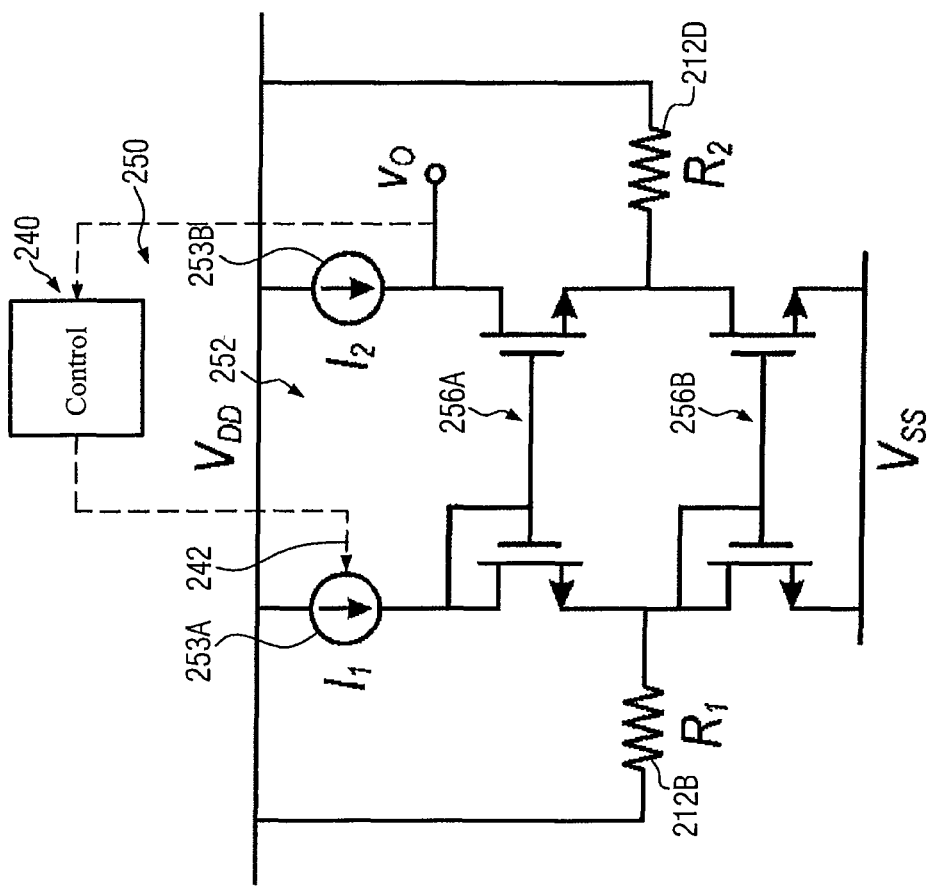

FIG. 2f schematically illustrates the interface circuit 250 including the current amplifier 252 in the configuration in which the sensor structure 210 is composed of the resistors 212B, 212D that provide the input currents for the amplifier 252, as discussed above. In this case, the resistance values of the resistors 212A, 212C (CF FIG. 2c) may be assumed to be negligible compared to the resistance values of the resistors 212B, 212D. Also in this case, the adjustable current sources 253A, 253B can be programmed or adjusted so as to obtain appropriate operating conditions for the amplifier 252, i.e., gain and offset are appropriately adjusted so as to obtain a desired swing of the output voltage for a given temperature range. The current sources 253A, 253B may be implemented in the form of any appropriate current mirror configuration, for instance in the form of a simple current mirror having a structure similar to the structural as shown for the current mirrors 256A, 256B (CF FIG. 2c), wherein the ratio of the currents in the sources 253A, 253B may readily be adjusted by selecting appropriate transistor characteristics, as is well known in the art. Similarly, other mirror configurations may be used, such as a Wilson mirror, a Cascode mirror and the like.

It should be appreciated that an appropriate control of the operating range of the amplifier 252 may be implemented on the basis of a feedback control, for instance with respect to the current source 253A, wherein the feedback control loop may be established by using a control unit 240 that may represent a part of the circuit portion 230 (CF FIG. 2a) and that may perform other control functions with respect to power management, signal processing, communication, and the like, as is for instance also described above with reference to the electronic system 100 when referring to the control unit 140.

Figure 2H:
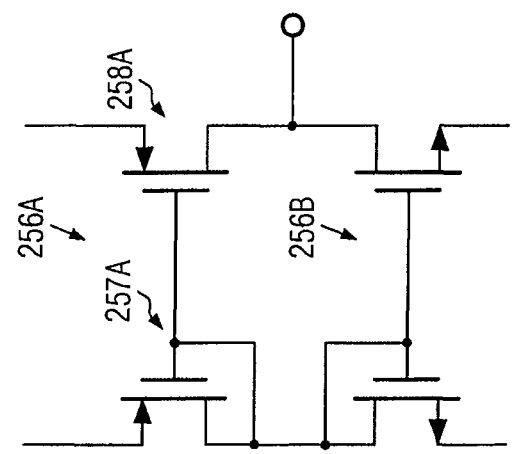
Figure 2G:
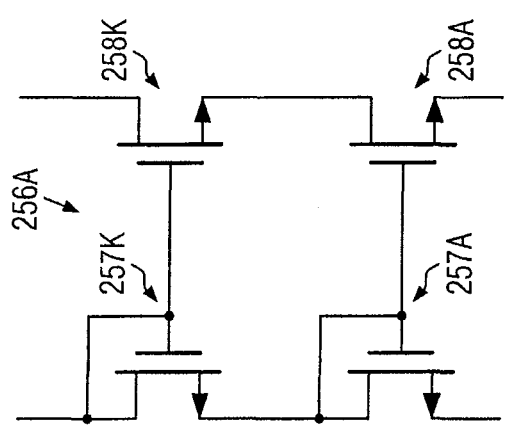

FIG. 2g schematically illustrates an alternative implementation of, for instance, the current mirror 256A (CF FIG. 2c), and which more than two transistors are incorporated, for example in a cascode configuration, wherein additional transistors 257K, 258K are provided so as to be connected in series to the transistors 257A, 258A, respectively. It should be appreciated that the corresponding configuration may also be applied to the second current mirror 256B (CF FIG. 2c). It should be appreciated, however, that any other appropriate current mirror structure can be implemented, for instance in the form of a Wilson mirror, and the like. That is, at least one additional transistor may typically be provided in the first and/or second current mirrors 256A, 256B so as to enhance overall performance, if considered appropriate.

FIG. 2h schematically illustrates the first and second current mirrors 256A, 256B according to an embodiment, in which transistors of inverse conductivity type are provided in order to enhance overall performance in terms of gain and current consumption of the current amplifier composed of the first and second current mirrors 256A, 256B. For example, in the embodiment shown the transistors 257A, 258A of the first current mirror 256A are provided in the form of p-channel transistors, while the transistors of the second current mirror 256B are implemented as n-channel transistors. To this end, well-established CMOS technologies can be used, while in other cases, other technologies may be applied, in which transistors of different conductivity type can be implemented, such as bipolar transistors of inverse conductivity type.

Figure 2I:
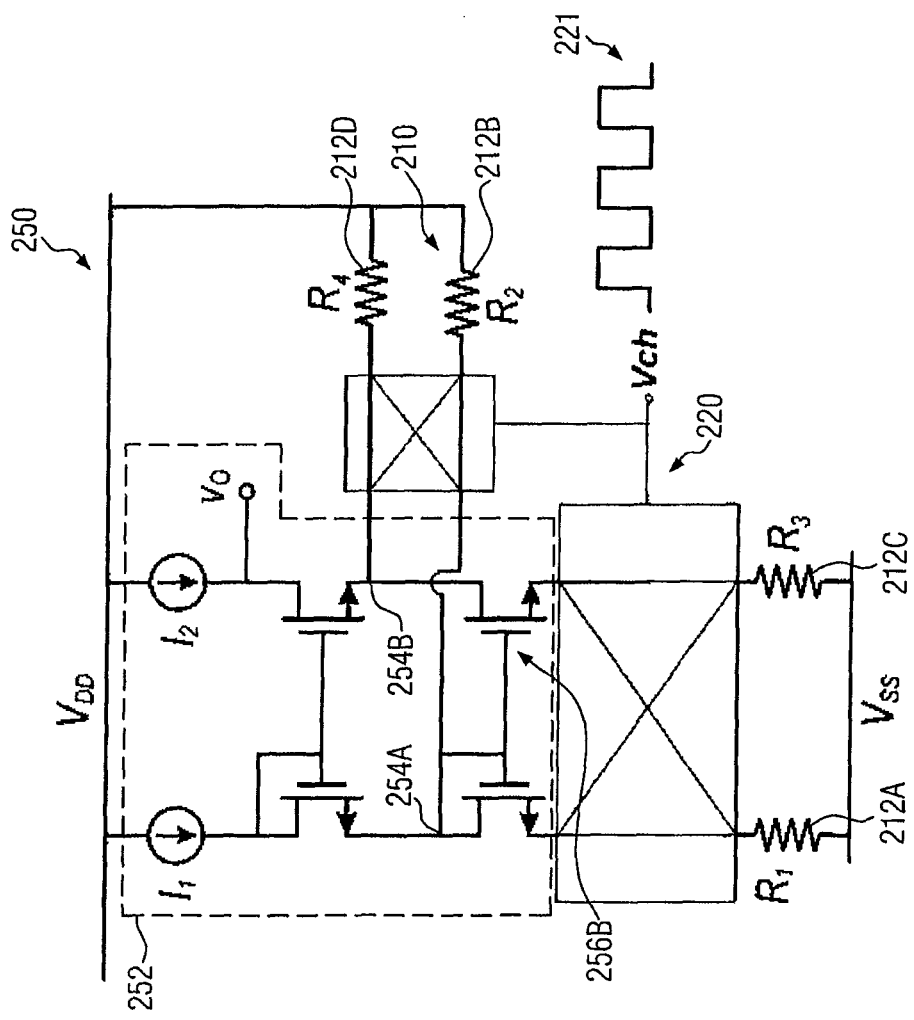

FIG. 2*i* schematically illustrates the interface circuit 250 according to a further illustrative embodiment, in which a chopper stage 220 is incorporated and connected between the sensor structure 210, which may for instance comprise the resistors 212A, . . . , 212D (CF FIG. 2*c*), and the current amplifier 252. The chopper stage 220 is appropriately configured so as to alternatingly connect the two bridge legs with the two current paths of the amplifier 252. The resistors 212B, 212D, which act as voltage/current converters, are alternatively connected to the input nodes 254A, 254B, respectively, under the control of a control signal 221 received by the chopper stage 220, while at the same time also the resistors 212A, 212C are alternatively connected to the source terminals of the two transistors of the second current mirror 256B. Thus, during a certain phase of the control signal 221, a certain configuration of the sensor structure 210 is connected to the amplifier 252, while in a subsequent phase of the control signal 221 the first configuration of the sensor structure 210, i.e., the first configuration of the bridge legs, is connected to the amplifier 252. In this manner, a significant reduction of noise in DC measurements can be accomplished. It should be appreciated that the chopper stage 220 may have any other configuration so as to provide for corresponding switches in order to perform the above described function of the chopper stage 220.

As a result, the present disclosure provides an electronic system including a resistive sensor structure and an analog interface circuit, which performs signal conditioning to an output current provided by the resistive sensor structure. To this end, the resistive sensor structure is used as a voltage/current converter in order to provide input signals for a current amplifier, which in turn amplify the difference of the input currents so as to provide an amplified output voltage. The current amplifier is supplied, i.e., "powered", by adjustable or programmable current sources and adjustment of gain and offset of the amplifier without being affected by the characteristics of the sensor structure. In this manner the same electronic circuit portion of the electronic system can be combined with resistive sensor structures of different configuration without requiring a re-design of the electronic components of the electronic system. Moreover, the electronic system can respond to a wide variety of different operating conditions, thereby ensuring enhance flexibility for various environmental conditions and applications for a given sensor structure. Consequently, the present disclosure enables enhanced flexibility in designing and producing low-cost and low-power electronic systems with superior performance, wherein the electronic systems may be used as disposable systems even for sophisticated applications, such as healthcare applications, and the like. In some illustrative embodiments, the superior flexibility with respect to design and manufacture of the electronic system may even further be enhanced by providing flexible substrate materials, which may thus enable attachment or incorporation in resilience products or materials, thereby even further increasing the overall applicability of the inventive electronic systems. Furthermore, due to the possibility of using the same design of the electronic circuit in combination with different sensor structures, the overall manufacturing process may be enhanced, in particular when the sensor structure is formed on a dedicated separate carrier material. For example, very cost efficient yet accurate and sensitive temperature sensor structures may be used in the inventive electronic systems on the basis of a given design of the electronic circuit, wherein a high sensitivity is obtained in a limited temperature range as is highly advantageous in the context of healthcare applications. It should be appreciated that other resistive sensor structures may efficiently be incorporated into the electronic system of the present disclosure in order to provide sensitivity to various environmental influences, such as pressure, humidity, magnetic field, and the like, wherein typically the corresponding environmental influence is "converted" into gate information of one or more of the resistive elements in the resistive sensor structure, thereby obtaining a change of the resistance value.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic system comprising:
 a sensor structure including first and second resistors, at least one of said first and second resistors being a variable resistor, the sensor structure being configured to provide first and second sensor currents; and
 an analog interface electrically coupled to said sensor structure, said analog interface including a first adjustable current source configured to provide a first source current and a current amplifier electrically coupled between first and second voltage terminals and configured to be supplied by the first source current from the first adjustable current source, receive the first and second sensor currents from said sensor structure, and provide an output signal indicative of an amplified difference of said first and second sensor currents, the current amplifier including:
 first and second input nodes, the first and second resistors being electrically coupled between the first voltage terminal and the first and second input nodes, respectively; and
 a first current mirror that includes a first mirror transistor electrically coupled with the first adjustable current source between the first voltage terminal and the first input node of the current amplifier, and a second mirror transistor electrically coupled between the first voltage terminal and the second input node of the current amplifier.

2. The electronic system of claim 1, further comprising a control unit configured to adjust said first adjustable current source so as determine a valid operating range of said current amplifier.

3. The electronic system of claim 1, further comprising a flexible substrate carrying said sensor structure, said adjustable current source, and said analog interface.

4. The electronic system of claim 1, further comprising a first carrier material in and on which is formed said sensor structure and a second carrier material, in and on which are formed said first adjustable current source and the analog interface, wherein said first and second carrier materials are spaced apart from each other.

5. The electronic system of claim 1, wherein said current amplifier is composed of transistors of only one conductivity type.

6. The electronic system of claim 1, wherein said current amplifier comprises a second current mirror electrically coupled to said input nodes.

7. The electronic system of claim 1, wherein:
the analog interface includes a second adjustable current source configured to provide a second source current;
the second current mirror includes third and fourth mirror transistors having respective control terminals electrically coupled to each other;
the third mirror transistor is electrically coupled between the first input node and the second voltage terminal;
the first resistor is electrically coupled in parallel with a first circuit combination that includes the first adjustable current source and the first mirror transistor between the first voltage terminal and the first input node;
the second adjustable current source and the second mirror transistor are electrically coupled between the first voltage terminal and the second input node;
the fourth mirror transistor is electrically coupled between the second input node and the second voltage terminal; and
the second resistor is electrically coupled in parallel with a second circuit combination that includes the second adjustable current source and the second mirror transistor between the first voltage terminal and the second input node.

8. The electronic system of claim 1, further comprising a chopper stage electrically coupled between said sensor structure and said current amplifier.

9. The electronic system of claim 1, wherein said sensor structure is configured to provide said first and second sensor currents as currents that depend on at least one of temperature, pressure, inertia, and magnetism.

10. An electronic system comprising:
a resistive sensor structure formed on a flexible substrate material, said resistive structure being responsive to at least one external influence; and
an interface circuit electrically coupled to said resistive sensor structure, formed on said flexible substrate material, and including a first adjustable current source configured to provide a first source current and an adjustable current amplifier electrically coupled between first and second voltage terminals and configured to receive a first input current and the first source current and to output a signal indicative of a response of said resistive structure to said at least one external influence, the current amplifier including:
first and second input nodes, the first and second resistors being electrically coupled between the first voltage terminal and the first and second input nodes, respectively; and
a first current mirror that includes a first mirror transistor electrically coupled with the first adjustable current source between the first voltage terminal and the first input node of the current amplifier and a second mirror transistor electrically coupled between the first voltage terminal and the second input node of the current amplifier.

11. The electronic system of claim 10, wherein said resistive sensor structure is configured to provide the first input current and a second input current to said adjustable current amplifier.

12. The electronic system of claim 10, further comprising a control circuit formed on said flexible substrate material and configured to control the adjustable current source so as to adjust an operating range of said adjustable current amplifier.

13. The electronic system of claim 10, wherein said resistive sensor structure is formed on a first carrier material and said interface circuit is formed on a second carrier material that is spaced apart from said first carrier material.

14. The electronic system of claim 10, wherein:
the analog interface includes a second adjustable current source configured to provide a second source current;
the adjustable current amplifier includes a second current mirror including third and fourth mirror transistors having respective control terminals electrically coupled to each other;
the sensor structure includes first and second resistors;
the third mirror transistor is electrically coupled between the first input node and the second voltage terminal;
the first resistor is electrically coupled in parallel with a first circuit combination that includes the first adjustable current source and the first mirror transistor between the first voltage terminal and the first input node;
the second adjustable current source and the second mirror transistor are electrically coupled between the first voltage terminal and the second input node of the current amplifier;
the fourth mirror transistor is electrically coupled between the second input node and the second voltage terminal; and
the second resistor is electrically coupled in parallel with a second circuit combination that includes the second adjustable current source and the second mirror transistor between the first voltage terminal and the second input node.

15. The electronic system of claim 14, wherein the sensor structure includes:
a third resistor electrically coupled with the third mirror transistor between the first input node and the second voltage terminal; and
a fourth resistor electrically coupled with the fourth mirror transistor between the second input node and the second voltage terminal.

16. An electronic system comprising:
a resistive sensor structure including first and second resistors and configured to produce first and second sensor currents; and
a current amplifier electrically coupled between first and second voltage terminals and configured to receive the first and second sensor currents and produce an output voltage corresponding to a difference between the first and second sensor currents, the current amplifier including:
first and second input nodes, the first and second resistors being electrically coupled between the first voltage terminal and the first and second input nodes, respectively;
an adjustable first current source configured to provide a first source current;
a second current source configured to provide a second source current;
a first current mirror that includes a first mirror transistor electrically coupled with the first current source between the first voltage terminal and the first input node of the current amplifier, and a second mirror transistor electrically coupled with the second current source between the first voltage terminal and the second input node of the current amplifier;
a second current mirror that includes a third mirror transistor electrically coupled between the first input node and the second voltage terminal, and a fourth mirror transistor electrically coupled the second input node and the second voltage terminal.

17. The electronic system of claim 16, wherein the sensor structure includes:
   a third resistor electrically coupled with the third mirror transistor between the first input node and the second voltage terminal; and
   a fourth resistor electrically coupled with the fourth mirror transistor between the second input node and the second voltage terminal.

18. The electronic system of claim 16, further comprising a control circuit configured to control the first current source so as to adjust an operating range of said current amplifier.

19. The electronic system of claim 16, comprising:
   a substrate; and
   first and second carrier material blocks spaced apart from each other and positioned on the substrate, the first carrier material block including the sensor structure and the second carrier material block including the current amplifier.

20. The electronic system of claim 16, wherein:
   the first resistor is electrically coupled in parallel with a first circuit combination that includes the first adjustable current source and the first mirror transistor between the first voltage terminal and the first input node; and
   the second resistor is electrically coupled in parallel with a second circuit combination that includes the second current source and the second mirror transistor between the first voltage terminal and the second input node.

* * * * *